H. P. SPENCER.
FISH STAKE.
APPLICATION FILED MAR. 13, 1914.

1,197,676.

Patented Sept. 12, 1916.

Witnesses.
Joseph W. McGraw
Marie Pelletier

Inventor.
Henry P. Spencer

UNITED STATES PATENT OFFICE.

HENRY P. SPENCER, OF MALTBY, MICHIGAN, ASSIGNOR OF ONE-HALF TO LAURENCE S. McGRAW, OF BAY CITY, MICHIGAN.

FISH-STAKE.

1,197,676.      Specification of Letters Patent.      Patented Sept. 12, 1916.

Application filed March 13, 1914. Serial No. 824,587.

*To all whom it may concern:*

Be it known that I, HENRY P. SPENCER, a citizen of the United States, residing at Maltby, in the county of Ogemaw and State of Michigan, have invented certain new and useful Improvements in Fish-Stakes; and I do hereby declare the following to be a full, clear, and exact description of the invention, such as will enable others skilled in the art to which it appertains to make and use the same.

This invention relates to fish stakes and pertains more particularly to that type of fish net stakes in which the stake is made in two parts, the lower part adapted to be driven into the bed of the river or other body of water in which the nets are to be placed, the upper part of the stake being hinged to the lower part and adapted to be folded down so as to lie close to the ground when not in use, thereby avoiding the liability of having the stake swept away or broken by ice during the winter season.

My improvement relates more specifically to the construction of the hinged joint by which the upper part of the stake is locked in its raised position when the stake is in use and by which it can be readily unlocked and folded down when the stake is not in use.

The objects of my improvement are to provide a joint that can be readily locked and unlocked even though the water may be of considerable depth.

A further object is to provide a joint that will be equally rigid in all directions to resist the sidewise pull of the nets, the action of the waves and other forces tending to bend or break the stake.

A still further object is to provide a joint that will reduce to a minimum the liability of the joint becoming clogged by sand or other material along the bed of the river.

With these and certain other objects in view which will appear later in the specification, my invention consists in the devices described and claimed and the equivalents thereof.

Figure 5:
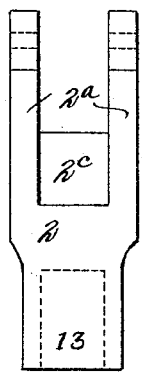
Figure 6:
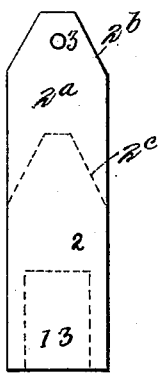
Figure 7:
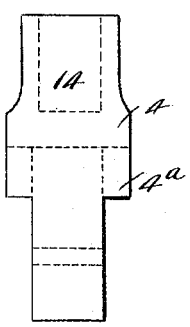
Figure 8:
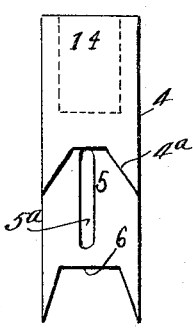
Figure 3:
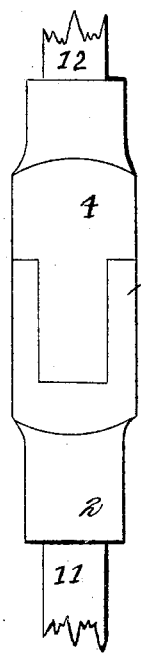
Figure 4:
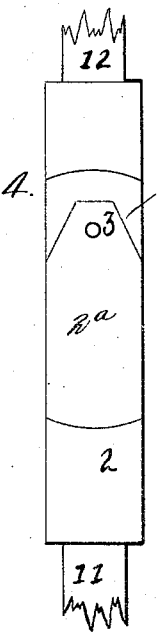
Figure 1:
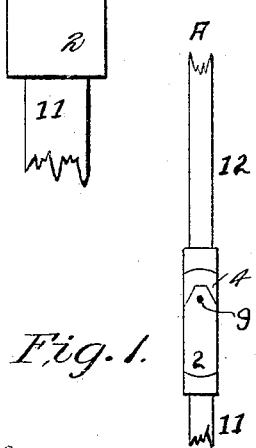
Figure 2:
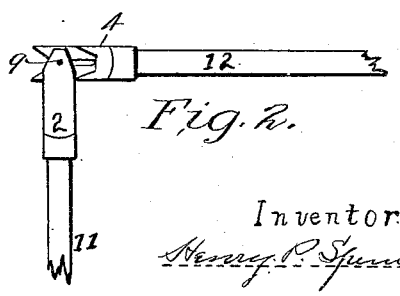

In the drawings, Figure 1 is a side elevation of my improved joint, showing the two parts of the stake locked together. Fig. 2 is a similar view, showing the stake members unlocked and the upper member folded to a horizontal position. Fig. 3 is an enlarged front view of the joint lock. Fig. 4 is a side view. Figs. 5 and 6 are respectively front and side views of the lower member of the joint. Figs. 7 and 8 are respectively front and side views of the upper member of the joint.

As is clearly shown in the drawings, 11 represents the lower stake member, which is driven into the bed of the river or other body of water in which the net is to be put, and 12 is the upper stake member adapted to be folded down to a substantially horizontal position when the stake is not in use.

My improved joint comprises a lower member 2 having a socket 13 adapted to receive the upper end of the stake member 11, and an upper member 4 formed with a socket 14 to receive the lower end of the upper stake member 12. The lower member 2 is formed with a pair of upwardly extending arms $2^a$, the upper end of each arm formed with an upwardly projecting beveled tongue $2^b$. Connecting the arms $2^a$ is an upwardly projecting beveled lug $2^c$, as shown in Figs. 5 and 6.

The upper member 4 of the joint is formed with a downwardly projecting central tongue 5, the lower end of this tongue being formed with a recess 6 adapted to receive the upwardly projecting lug $2^c$ of the member 2. At each side of the central tongue 5 and near its upper part, as shown in Fig. 8, is formed a pocket $4^a$ adapted to receive the upper end of one of the upwardly projecting arms $2^a$ of the member 2. The central tongue 5 is formed with an elongated slot $5^a$ which registers with openings 3, 3 provided near the upper ends of the arms $2^a$. A suitable pin or bolt 9 is passed through the openings 3, 3 and through the slot $5^a$ when the two members of the joint are assembled, as shown in Figs. 1 and 2.

When the stake is to be set up, as in Fig. 1, the upper ends of the arms $2^a$ are engaged in the pockets $4^a$ and the lug $2^c$ is engaged in the recess 6. When in this position the upper stake member 12 is securely locked to the lower member 11 in an upright position and can not be dislodged, except by lifting it bodily until the interlocking members are disengaged. The slot $5^a$ permits the stake member 12 to be lifted when it is desired to fold the stake, as shown in Fig. 2.

It will be noted that the interlocking of the projections of member 2 with the recesses of member 4 insures rigidity in all directions, as distinguished from stake joints in which rigidity is secured in only one or two directions. It will also be noted that the movement of adjusting the stake to its upper or horizontal position will automatically clean out the slot 5ª and dislodge any dirt that may have accumulated, and it will be further noted that the upper surfaces of the lower stake member are arranged to slope outwardly, being thereby adapted to shed any dirt or sediment that may tend to accumulate upon them.

By the means above described I have produced a simple inexpensive and yet strong and durable joint for fish stakes.

Having thus described my invention, what I claim and desire to secure by Letters Patent is:

In a two-part fish stake, a joint comprising a lower member having a socket, a pair of arms carried by said lower member, said arms spaced apart and having their upper extremities beveled, an upwardly projecting beveled lug formed integral with and connecting said arms at their lower ends; an upper joint member comprising a stake-receiving socket, a downwardly projecting central tongue, the lower end of said tongue formed with a recess having inwardly beveled walls adapted to register with the said beveled lug, and oppositely disposed pockets formed in said upper member at the sides of said tongue and adapted to receive the beveled extremities of said arms, an elongated slot in said tongue, and a pin connecting the upper ends of said arms and loosely received in said slot.

In testimony whereof, I affix my signature in presence of two witnesses.

HENRY P. SPENCER.

Witnesses:
 ADA GURLEY,
 BELLE BIXBY.

Copies of this patent may be obtained for five cents each, by addressing the "Commissioner of Patents, Washington, D. C."